Aug. 18, 1959  H. L. DANIELS  2,900,629
INDEXING APPARATUS
Filed March 23, 1955

GEARING BOX

INVENTOR
HOWARD L. DANIELS
BY Cushman, Darby & Cushman
ATTORNEYS

2,900,629

INDEXING APPARATUS

Howard L. Daniels, St. Paul, Minn., assignor, by mesne assignments, to Sperry Rand Corporation, New York, N.Y., a corporation of Delaware Application March 23, 1955, Serial No. 496,170

17 Claims. (Cl. 340—347)

This invention relates to apparatus for assuring accurate conversion of an analog quantity to a digital quantity, and more particularly to apparatus for precisely indexing commutators when digital information therefrom is desired.

In numerous instances, it may be desirable to convert the angular displacement of a rotary shaft into a digital quantity. Commutators offer an especially straight-forward means for obtaining digital indications of an analog shaft position. However, it is necessary to incorporate some means in such a mechanism to insure against an ambiguous indication and yet to make certain that a complete read-out is obtained.

Two examples wherein such apparatus may be utilized are the automatic weighing of railroad freight cars and a remote indication of the azimuth of a radar antenna. Other examples of the use of this invention will be apparent, and no limitation to the specific examples mentioned is intended.

Commutator means provides one of the most useful and economical methods of converting a shaft position to a digital quantity. However, a conventional commutator mechanism may come to rest with its brushes positioned somewhere in between two adjacent contact segments, thereby resulting in an incorrect digital indication or no indication at all. This problem is especially acute in carry-overs from 9 to 0, for example. Where more than one commutator is involved, gross errors may result from ambiguity.

To obviate ambiguities in indexing apparatus usable in an analog to digital conversion system, this invention provides a commutator which has a plurality of contact segments and an arm disposed on a shaft so as to make contact with the segments and a detent wheel having a like plurality of teeth thereon with a locking bar and an anti-dead center device mounted to engage the edge of said teeth when the locking bar moves into engagement with the crown of a tooth after the shaft has been rotated. The wheel is thereby urged to move slightly so that a locking bar may come to rest in a tooth valley. The contact arm is thereby positioned accurately onto only one of the contact segments.

In addition, the invention encompasses a commutator which has a plurality of segments thereon and an arm rotatable by means of a shaft for contacting the segments, the commutator having means associated therewith for effectively allowing the commutator to rotate with its arm until the arm and commutator have moved the distance between like points on adjacent contact segments, at which time the commutator is rotated backwards the same distance so that the arm jumps from one contact segment to an adjacent contact segment. In this manner, the rotation of the wiper arm is compensated for, and the means for accomplishing same in accordance with this invention is a cam rotatable at a speed of $n$ times the speed of the commutator arm, where $n$ equals the number of possible contact segments on the commutator, and cam follower means securely attached to the commutator. With the cam surface in a form of a spiral, the cam follower will move the commutator during one rotation of the cam a distance corresponding to the distance between adjacent contact segments on the commutator and then "jump" the commutator backwards one contact segment distance so that the wiper arm is accurately indexed on only one of the contact segments.

By combining the two commutators mentioned in the two preceding paragraphs, an analog to digital converter system may be made with extreme accuracy.

It is accordingly an object of this invention to provide improved means for converting analog quantities to digital quantities.

A further object of this invention is to provide improved accurate indexing of the commutator used in a shaft type analog to digital converter.

It is a further object of this invention to provide in an analog to digital converter of the shaft type, improved means for positioning a commutator brush substantially in the center of the nearest contact segment.

A still further object of this invention is to provide in an analog to digital converter of the shaft type having a plurality of commutators, improved means for reducing the possibility of an incorrect indication from one commutator to the next.

A further object of this invention is to provide in an analog to digital converter of the shaft type having a plurality of commutators, improved means for locking the commutator shafts in a fixed relation to each other.

It is a further object of this invention to provide a mechanism for the above stated purposes comprising a detent wheel, a detent locking bar, and an anti-dead center device to urge rotation of the detent wheel if the locking bar comes to rest incorrectly on the detent wheel.

It is a further object of this invention to provide a geared commutator system including a mechanism for rotatably positioning a first commutator with respect to a cam mounted to rotate with the arm of another commutator to insure against ambiguous indication from the first commutator.

Further objects and the entire scope of the invention will become apparent from the following description. The invention may best be understood by reference to the accompanying drawings in which an exemplary embodiment of the invention is shown.

Figure 1:
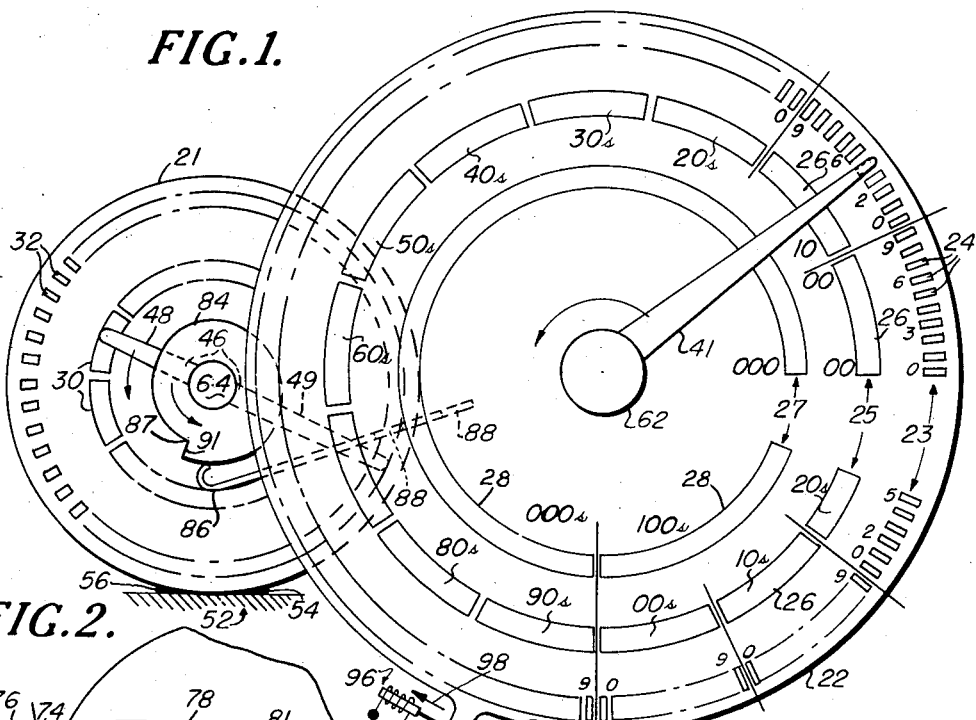
Figure 1 is a front view of two geared commutators and cooperating parts in accordance with the present invention.

Referring to Figure 1, the invention may be conveniently understood with reference to a particular embodiment thereof for obtaining a five significant-decimal-digit number from 0 to 125, for example, in steps of two-hundredths (.02). This requires the use of five sets of commutator segments which may conveniently be arranged on two separate commutators. From the high speed commutator 21, two significant-decimal-digits (e.g., tenths and hundredths) may be obtained, and from the low speed commutator 22 the units, tens and hundreds may be obtained. The low speed commutator 22, as illustrated, contains one annular row 23 of 125 discrete areas or contact segments 24, each segment representing (for example) a digital unit, one annular row or set 25 of thirteen segments 26 for tens, and a third annular set 27 of two segments 28 for hundreds. The high speed commutator 21 contains one set of ten segments 30 for the tenth part of a unit, and a second set of 50 segments 32 for the indication of the nearest .02 of a unit. The last mentioned set of segments could as well contain 100 segments to represent a number to the nearest one-hundredth. It will be obvious that the invention is not limited to any particular number of segment sets or any particular number of associated commutators. In other words, the invention may be practiced with more or less than a five digit number from more or less than 2 commutators.

Figure 3:
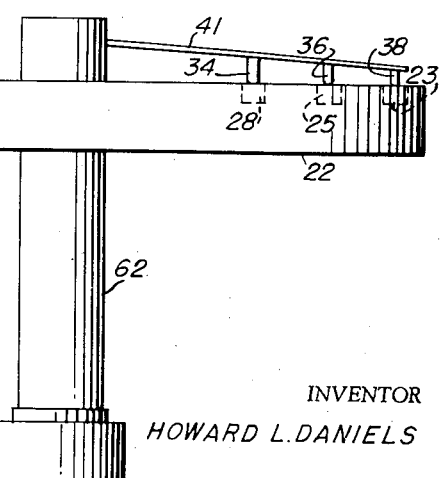
Figure 3 is a partial plan view of the geared commutator assembly in accordance with the invention.

For the low speed commutator 22, the brushes 34, 36, and 38 (Figure 3) may be mounted on a single commutator wiper arm 41. The brushes 42 and 44 for the high speed commutator 21 may be mounted on a single arm in a similar manner as the brushes for the low speed commutator 22; however, as shown in Figures 1 and 3, the commutator wiper arm 46 is preferably divided into two portions 48 and 49, each section extending in diametrically opposite directions to provide better balance. The high speed commutator 21 is held immovable as shown at 52 where the points 54 and 56 represent spot welds or the like. The low speed commutator 22 rotates only a few degrees since attached thereto is a nose 58 which is prevented from moving counterclockwise by the stop 61; clockwise movement of low speed commutator 22 is also limited as will be seen hereinafter. The two wiper arms 41 and 46 are geared to each other so that the arm 46 of the high speed commutator 21 completes a full revolution each time the brush 38 (Figure 3) for the annular row 23 of 125 contact segments advances one segment. The two arms 41 and 46 are rotated respectively by shafts 62 and 64, these shafts being geared to each other in gearing box 66 and driven by an incoming shaft 68. The low speed commutator 22 may conveniently be divided, for example, into 133⅓ equal parts; with each segment 24 representing one part thereof and with only 125 such segments in the annular row 23, there will be a slight open space between the first and 125th segment in the annular row 23. The commutator 22 could, of course, have annular rows completely filled with segments. The commutator wiper arms 41 and 46 may be made to revolve at a ratio of 1 to 133⅓, respectively, by suitable gears in gearing box 66 in accordance with the segmental division of the low speed commutator 22. However, it is to be understood that no limitation is intended to the particular ratio mentioned. Expressed broadly, the wiper arms 46 and 41 may be driven at a speed ratio of $n:1$, where $n$ equals the total possible number (e. g., 133⅓, not 125) of contact segments in an annular row (e.g., row 23).

Figure 2:
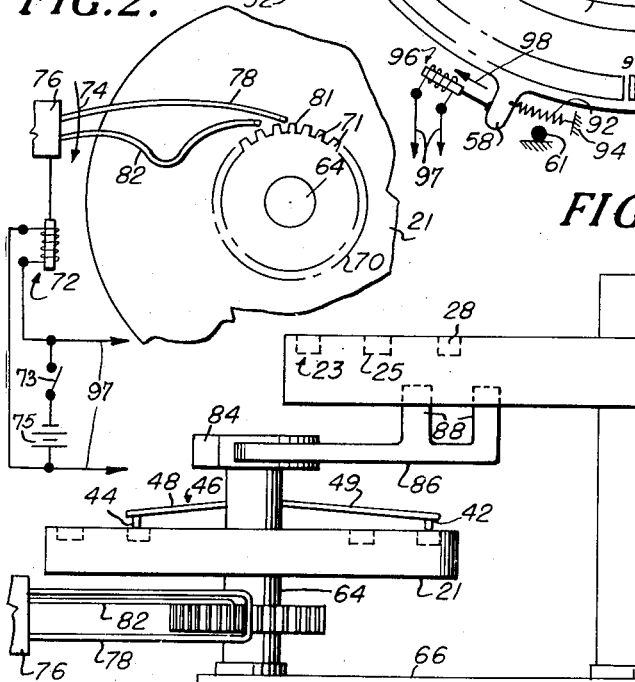
Figure 2 is a partial rear view of the high speed commutator shown in Figure 1 along with its cooperating parts.

Reference is now made to Figure 2 which illustrates in part the rear view of high speed commutator 21. Mounted integrally with the high speed commutator shaft 64 to rotate with the arms 48 and 49 (Figure 3) is a detent wheel 70 having teeth 71 corresponding in number to the number of contact segments 32 (Figure 1) in the outer annular row of high speed commutator 21. The detent wheel 70 may be a common spur-gear, or it may have somewhat sharper teeth. When an accurate indication of the position of rotation of the arms 49 and 50 is desired, solenoid 72 may be actuated by closure of switch 73 which allows current from battery 75 to energize the coil of solenoid 72 to cause a downward movement of the holder 76 as shown by arrow 74. When this happens, the locking bar 78 is moved against the detent wheel 70 to fit in the valley between two teeth and to lock it securely in position. The locking bar 78 is so located that the brushes 42 and 44 are positioned squarely in contact with a pair of commutator segments 32 and 30, respectively, when locking bar 78 rests in the valley between two teeth. At times detent wheel 70 may be so located that locking bar 78 will fall upon a crest or crown 81 of a tooth on the wheel. This would cause an incorrect positioning of the brushes with respect to the contact segments 32. To obviate this difficulty, an anti-dead center device such as hook arm 82 may be utilized. Upon the downward movement of holder 76, the pusher arm 82 may strike the side of a tooth and urge the detent wheel 70 slightly allowing the locking bar 78 to drop into position between two teeth.

It will be understood that a certain amount of lost motion is necessary for the operation of the anti-dead center device 82. Such lost motion may be obtained in any desirable manner, such as by freeing the input shaft 68 from its driver (not shown) or by play between the gears in the gearing box 66. The shape of the locking bar 78 may be seen with reference to Figure 3. It may be fabricated of flexible wire so that after making contact with a crown 81, it can straighten to allow the anti-dead center device 82 to make contact with the teeth 71 of detent wheel 70. By the cooperation of the bar 78 and arm 82, the brushes on the wiper arm 46 for the high speed commutator 21 may be accurately positioned on one of their respective commutator segments. However, it will apparent that if the teeth 71 are modified in shape so as to be more pointed, the anti-dead center device 82 may be eliminated as long as the locking bar 78 is strong enough to turn the detent wheel the necessary amount.

Referring back to Figure 1, a cam 84 is positioned on shaft 64 to move with the rotation of the shaft and therefore with the commutator arms 48 and 49. Cam 84 may have a configuration of a spiral of Archimedes, so that a cam follower, such as the hooked arm 86, can move at a constant velocity along a radial line of the cam. From Figure 3, it will be seen that cam follower 86 is connected by its arms 88 permanently to low speed commutator 22, and consequently, acts as a positioning arm for the commutator 22. That is, since the commutator 22 is permanently attached to cam follower 86, the commutator 22 will rotate a few degrees when cam follower 86 is positioned against cam 84 during one revolution thereof. Assuming for the moment that cam follower 86 is held against cam 84, it will be apparent that during one revolution of cam 84 in the counterclockwise direction, for example, starting with the follower 86 at point 87 of the cam, commutator 22 will turn gradually in a counterclockwise direction and the low speed wiper arm 41 will stay approximately on center of one of the contact segments 24 since the arm 41 is simultaneously moving counterclockwise at the same rate of speed. When cam 84 rotates to the point where follower 86 drops the distance of step 91, commutator 22 will move clockwise and effectively "jump" low speed wiper arm 41 to the center of the next segment 24. It is apparent then that cam 84 and follower 86 may cooperate to compensate for the continuous rotation of the low speed wiper arm 41.

During the time when no digital indication is desired, commutator 21 may be rotated at a comparatively high speed, and consequently, it may be desirable that the cam follower be a rotatable wheel on an arm or that the hooked arm 86 be held away from cam 84. The latter may be accomplished by spring 92 attached between nose 58 and point 94 permanently; however, between counterclockwise rotation of low speed wiper arm 41 may, by way of drag, rotate commutator 22 counterclockwise and eliminate the necessity of a spring 92. As a practical matter, the drag may be held to a minimum by means of ball bearings and thereby be insufficient to rotate commutator 22; spring 92 would then, of course, be desirable. Commutator 22 may be limited in its counterclockwise rotation by stop 61. At the same time as solenoid 72 (Figure 2) is energized by closure of switch 73 for accurate indexing of the commutator brushes on the high speed commutator 21, solenoid 96 may also be energized by battery current in lines 97 to rotate commutator 22 in the clockwise direction as indicated by arrow 98 so that cam follower 86 will be held against the cam 84  Therefore, the low speed commutator 22 is positioned for an unambiguous indication when both solenoids 72 and 96 are energized. A geared commutator system of the type described above for digital read-out of a shaft position has the advantage of providing a convenient and error-free means to assure the positive read-out of all digits from the commutators.

Upon obtaining an understanding of the basic principles of the invention from the exemplary embodiment described above, it will be apparent that many different embodiments of the invention are possible without departing from the scope thereof. Therefore, it is intended that all matter contained in the above description and shown in the accompanying drawings shall be interpreted as illustrative and unlimitative, the scope of the invention being defined by the appended claims.

What is claimed is:

1. Apparatus for indexing a commutator arm accurately with respect to contact segments on a commutator comprising a commutator having at least one annular row of discrete contact segments, a wiper arm with at least one brush attached thereto, a rotatable shaft disposed concentrically with said annular row, said wiper arm being attached to the shaft so that a brush thereon may be in contact with the segments in said annular row, a detent wheel mounted on said rotatable shaft, said wheel having teeth corresponding in number to the number of contact segments in said one annular row, and means only engageable with the wheel and teeth after said shaft has been rotated to cause said brush to be positioned on only one of the contact segments in said annular row.

2. Apparatus as in claim 1 wherein the wheel and teeth engageable means includes a locking bar disposed in operable relation with said teeth and an anti-dead center device mounted to cooperate with said locking bar, an electrical means for moving the locking bar and said device into engagement with said wheel only after the wheel has stopped rotating, the arrangement being such that when said wheel is stopped, the locking bar moves into contact therewith and when it engages a crown of one of said teeth the anti-dead center device urges the detent wheel to turn so that said locking bar falls into a tooth valley.

3. Apparatus for indexing a commutator arm accurately with respect to contact segments on a commutator comprising a commutator having at least one annular row of discrete contact segments, a wiper arm with at least one brush attached thereto, a rotatable shaft disposed concentrically with said annular row, said wiper arm being attached to the shaft so that a brush thereon may be in contact with the segments in said annular row, and means including means rotatable at $n$ times the angular speed of said rotatable shaft, where $n$ equals the total possible number of discrete contact segments in said annular row, for positioning said brush on only one of said contact segments.

4. Apparatus as in claim 3 wherein the means including the rotatable means includes cam surfaced means and cam follower means affixed to said commutator for positioning the commutator in accordance with the cam surfaced means.

5. Apparatus for indexing a commutator arm accurately with respect to contact segments on a commutator comprising a commutator having at least one annular row of discrete contact segments, a wiper arm with at least one brush attached thereto, a rotatable shaft disposed concentrically with said annular row, said wiper arm being attached to the shaft so that a brush thereon may be in contact with the segments in said annular row, and means to compensate for the rotation of the commutator and said wiper arm during the time the wiper arm moves a distance corresponding to the distance between like points of adjacent contact segments.

6. Apparatus for converting an analog quantity into a digital quantity comprising at least a high speed commutator and a low speed commutator each having at least one annular row of discrete contact segments representing respectively the possible significant figures in a digital quantity, a rotatable driving shaft the angular displacement of which represents said analog quantity, a commutator wiper arm for each of said high and low speed commutators with brushes thereon for each annular row of contact segments on the respective commutator, means associated with said rotatable shaft for driving said high and low speed wiper arms at a predetermined speed ratio, means associated with said high speed wiper for positively indexing a brush thereon to only one contact segment in an annular row on the high speed commutator, and other means associated with said high speed wiper arm and the low speed commutator for positioning only one contact segment in an annular row on the low speed commutator to a brush on the low speed wiper arm.

7. Apparatus for converting an analog quantity into a digital quantity comprising at least a high speed commutator and a low speed commutator each having at least one annular row of discrete contact segments representing respectively the possible significant digits in a digital quantity, a rotatable driving shaft the angular displacement of which represents said analog quantity, a commutator wiper arm for each of said high and low speed commutators with brushes thereon for each annular row of contact segments on the respective commutator, means associated with said rotatable shaft for driving said high and low speed wiper arms at a predetermined speed ratio, a detent wheel restrained to rotate with the high speed wiper arm, said wheel having teeth corresponding in number to the number of contact segments in an annular row on the high speed commutator, means engageable with the teeth only after said shaft has been rotated for positively indexing a brush on the high speed wiper arm to only one contact segment in an annular row on the high speed commutator, and means associated with said high speed wiper arm and the low speed commutator for positioning only one contact segment in an annular row on the low speed commutator to a brush on the low speed wiper arm.

8. Apparatus as in claim 7 wherein the teeth engageable means includes a locking bar disposed in operable relation with said teeth, the arrangement being such that when said wheel is stopped, the locking bar may move into contact therewith.

9. Apparatus as in claim 7 wherein the teeth engageable means includes a locking bar disposed in operable relation with said teeth and an anti-dead center device mounted to cooperate with said locking bar, the arrangement being such that when said wheel is stopped, the locking bar may move into contact therewith and when it engages a crown of one of said teeth, the anti-dead center device urges the detent wheel to turn so that said locking bar falls into a tooth valley.

10. Apparatus for converting an analog quantity into a digital quantity comprising at least a high speed commutator and a low speed commutator each having at least one annular row of discrete contact segments representing respectively the possible significant digits in a digital quantity, a rotatable driving shaft the angular displacement of which represents said analog quantity, a commutator wiper arm for each of said high and low speed commutators with brushes thereon for each annular row of contact segments on the respective commutator, means associated with said rotatable shaft for driving said high and low speed wiper arms at a speed ratio of $n:1$, where $n$ equals the total possible number of discrete contact segments in an annular row on the low speed commutator, means associated with said high speed wiper arm for positively indexing a brush thereon to only one contact segment in an annular row on the high speed commutator, and means including means rotatable with said high speed wiper arm for positioning only one contact segment in an annular row on the low speed commutator to a brush on the low speed wiper arm.

11. Apparatus for converting an analog quantity into a digital quantity comprising a high speed commutator and a low speed commutator each having annular rows of discrete equally spaced contact segments representing respectively the possible significant digits in a digital quantity, a rotatable shaft the angular displacement of which represents said analog quantity, a commutator wiper arm for each of said high and low speed commutators with brushes thereon for each annular row of contact segments on the respective commutator, means associated with said rotatable shaft to cause the high speed wiper arm to revolve once while the low speed wiper arm rotates a distance equal to the distance between like points of adjacent contact segments in the annular row for the lowest significant digit on the low speed commutator, a toothed detent wheel and a cam each connected with said high speed wiper arm for rotation therewith, a cam follower attached to turn said low speed commutator, a locking bar and an anti-dead center device disposed pivotally in cooperative relation with each other and with said toothed detent wheel, said wheel having the same number of teeth as there are contact segments in the annular row for the lowest significant digit on the high speed commutator, the arrangement being such that upon stoppage of the rotatable shaft said locking bar and anti-dead center device may move into contact with the teeth of said detent wheel to unambiguously index the brushes on said high speed wiper arm with one of their respective contact segments thereby locating said cam in such a position that said cam follower when in contact with the cam positions said low speed commutator so that only one of the contact segments in any one annular row on the low speed commutator is in contact with a brush on the low speed wiper arm.

12. Apparatus as in claim 3 wherein the means rotatable at $n$ times the angular speed of said rotatable shaft has a cam surface.

13. Apparatus as in claim 5 wherein the compensating means includes means to permit the commutator to rotate in the same direction and at the same speed as said wiper arm during the movement of the wiper arm said corresponding distance.

14. Apparatus as in claim 13 including means for effectively jumping said wiper arm from one contact segment to the next after the wiper arm has been rotated said corresponding distance in said direction comprising means for rotating said commutator said corresponding distance in a direction reverse to said direction.

15. Apparatus for converting an analog quantity into a digital quantity comprising at least a high speed commutator and a low speed commutator each having at least one annular row of discrete contact segments representing respectively the possible significant figures in a digital quantity, a rotatable driving shaft the angular displacement of which represents said analog quantity, a commutator wiper arm for each of said high and low speed commutators with brushes thereon for each annular row of contact segments on the respective commutator, means associated with said rotatable shaft for driving said high and low speed wiper arms at a predetermined speed ratio, means associated with said high speed wiper arm for positively indexing a brush thereon to only one contact segment in an annular row on the high speed commutator, and other means associated with said high speed wiper arm for positioning only one contact segment in an annular row on the low speed commutator to a brush on the low speed wiper arm, said other means including means to compensate for the rotation of the low speed wiper arm during the movement thereof a distance corresponding to the distance between like point of adjacent contact segments in an annular row on the low speed commutator.

16. Apparatus for converting an analog quantity into a digital quantity comprising at least a high speed commutator and a low speed commutator each having at least one annular row of discrete contact segments representing respectively the possible significant digits in a digital quantity, a rotatable driving shaft the angular displacement of which represents said analog quantity, a commutator wiper arm for each of said high and low speed commutators with brushes thereon for each annular row of contact segments on the respective commutator, means associated with said rotatable shaft for driving said high and low speed wiper arms at a speed ratio of $n:1$, where $n$ equals the total possible number of discrete contact segments in an annular row on the low speed commutator, means associated with said high speed wiper arm for positively indexing a brush thereon to only one contact segment in an annular row on the high speed commutator, and means including cam surfaced means rotatable with said high speed wiper arm for positioning only one contact segment in an annular row on the low speed commutator to a brush on the low speed wiper arm.

17. Apparatus as in claim 16 wherein the means including the cam surfaced means comprises cam follower means affixed to said low speed commutator for positioning the low speed commutator in accordance with the cam surface means.

References Cited in the file of this patent

UNITED STATES PATENTS

| | | |
|---|---|---|
| 461,371 | Shaffer | Oct. 13, 1891 |
| 2,207,743 | Larson | July 16, 1940 |
| 2,444,471 | Samiran | July 6, 1948 |
| 2,656,497 | Schweighofer | Oct. 20, 1953 |